United States Patent [19]

Koizumi et al.

[11] Patent Number: 4,807,058
[45] Date of Patent: Feb. 21, 1989

[54] TAPE RECORDER INCLUDING DEVICE TO PREVENT IMPROPER OPERATION OF RECORDING OPERATION

[75] Inventors: Satoru Koizumi; Daisuke Teshima; Yoshio Katayama, all of HigashiHiroshima, Japan

[73] Assignee: Sharp Kabushiki Kaisha, Osaka, Japan

[21] Appl. No.: 908,718

[22] Filed: Sep. 18, 1986

[30] Foreign Application Priority Data

Sep. 20, 1985 [JP] Japan .................................. 60-209855

[51] Int. Cl.$^4$ ............................................. G11B 15/02
[52] U.S. Cl. ....................................... 360/60; 360/61; 360/62
[58] Field of Search ....................... 360/60, 61, 62, 63, 360/15; 379/83

[56] References Cited

U.S. PATENT DOCUMENTS

| | | | |
|---|---|---|---|
| 3,765,685 | 10/1973 | Harlen et al. | 360/60 |
| 4,000,515 | 12/1976 | Fukawa | |
| 4,396,803 | 8/1983 | Hashimoto | 379/83 |

FOREIGN PATENT DOCUMENTS

| | | |
|---|---|---|
| 2802255 | 8/1978 | Fed. Rep. of Germany . |
| 3151455 | 7/1982 | Fed. Rep. of Germany . |
| 1323489 | 8/1968 | United Kingdom . |
| 1222018 | 11/1968 | United Kingdom . |
| 1323145 | 8/1970 | United Kingdom . |
| 1332691 | 9/1970 | United Kingdom . |
| 2093255 | 8/1982 | United Kingdom . |
| 8001027 | 5/1980 | World Int. Prop. O. . |

Primary Examiner—Vincent P. Canney
Assistant Examiner—Kevin J. Fournier
Attorney, Agent, or Firm—Birch, Stewart, Kolasch & Birch

[57] ABSTRACT

A tape recorder comprising a cassette tape compartment for detachably housing a first and second cassette tapes, a capstan for driving the first and second cassette tapes coaxially mounted thereon, a mode selector member for selecting the driving mode for the first and second cassette tapes, operation means for causing the second cassette tape to perform a first or a second function and causing the first cassette tape to perform the first function, a device for allowing the second cassette tape to achieve the first or second function, in response to operation of the operation means corresponding to the first or second function, when the second cassette tape-driving mode has been selected by the mode selector member, a device for allowing the first cassette tape to achieve the first function, in response to operation of the operation means corresponding to the first function, when the first cassette tape-driving mode has been selected by the mode selector member, and a function blocking device for hindering the first cassette tape from achieving the second function when the operation means corresponding to the second function is operated in the first cassette tape-driving mode selected by the mode selector member.

5 Claims, 3 Drawing Sheets

TAPE RECORDER INCLUDING DEVICE TO PREVENT IMPROPER OPERATION OF RECORDING OPERATION

BACKGROUND OF THE INVENTION

The present invention relates to a recording operation preventive device of a tape recorder in which a plurality of cassette tapes can be loaded in a pile.

A tape recorder has been developed in which two cassette tapes can be coaxially loaded in a pile and driven independently or simultaneously by one capstan.

In such a tape recorder, the recording function is provided only for the second cassette tape and not for the first cassette tape. However, a recording button provided for the second cassette tape can be operated even when the first cassette tape with no recording function is being driven. In the light of operationability, it is unnatural or unreasonable that the recording button is operable when it is not necessary for actual operation. This unnaturalness seriously damages the value of the recorder.

SUMMARY OF THE INVENTION

Accordingly, an object of the present invention is to provide a tape recorder capable of accommodating a plurality of cassette tapes coaxially in a pile in which, the cassette tapes are operated by common operating means for a function common to each cassette tape and by individual operating means for functions peculiar to each cassette tape and in which a function blocking device is provided so that operation of individual operating means provided for a function peculiar to a particular cassette tape does not affect cassette tapes which are not equipped for the function.

Another object of the present invention is to provide a tape recorder capable of accommodating a plurality of cassette tapes in a pile in which the recording operation is inhibited when a mode with no recording function is selected.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, a tape recorder of an embodiment of the present invention comprises a cassette tape compartment capable of detachably housing a first and a second cassette tapes; a capstan for driving the first and the second cassette tapes coaxially mounted thereon; a mode selector member for selecting a driving mode for the first or the second cassette tape; operation means for causing the second cassette tape to perform a first or a second function and causing the first cassette tape to perform the first function; means for allowing the second cassette tape to achieve the first or the second function, in response to operation of the operation means corresponding to the first or the second function, when the second cassette tape-driving mode has been selected by the mode selector member; means for allowing the first cassette tape to achieve the first function, in response to operation of the operation means corresponding to the first function, when the first cassette tape-driving mode has been selected by the mode selector member; and function blocking means for hindering the first cassette tape from achieving the second function when the operation means corresponding to the second function is operated in the first cassette tape-driving mode selected by the mode selector member.

To achieve the above objects, an embodiment of the tape recorder of the present invention capable of housing at least a first and a second cassette tapes contains means for enabling the recording operation to be performed when the second cassette tape is selected, and means for preventing the recording operation from being conducted by the first cassette tape when the first cassette tape alone is selected. This recording operation preventive device is driven interlockingly with the mode selector member, and provided with a blocking member which disengages from a recording operation member only when the mode selector member is set at a position for the second cassette tape recording mode and a fool-proof member which detects presence or absence of an erroneous erasion preventive claw of the second cassette tape and disengages from the recording operation member only when the claw is present.

The second cassette tape can record information when the mode selector member is set at a position for the second cassette tape mode or for the dubbing mode so that the recording operation member disengages from the blocking member. The recording operation member also disengages from the fool-proof member when a recordable cassette tape with an erroneous erasion preventive claw is loaded as the second cassette tape. Therefore, the recording operation member is operable for recording information in the second cassette tape or dubbing from the first to the second cassette tapes only when both of the above two conditions are satisfied. Thus, unnaturalness in the light of operationability is eliminated.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

An embodiment of a tape recorder of the present invention can accommodate a plurality of cassette tapes coaxially in a pile and drive all or at least one of the cassette tapes simultaneously through one capstan. In the following description of the invention, it is assumed that the tape recorder can accommodate two cassette tapes (a first and a second cassette tapes) and that the first cassette tape is equipped for a reproducing function alone while the second cassette tape for recording, reproducing, fast-forwarding and rewinding functions. It is also assumed that a mode selection mechanism is used for selecting the first cassette tape mode, the second cassette tape mode, the dubbing mode in which information reproduced from the first cassette tape is simultaneously recorded in the second cassette tape, or the serial reproduction mode in which reproduction is conducted serially from one after the other cassette tapes.

Figure 3:
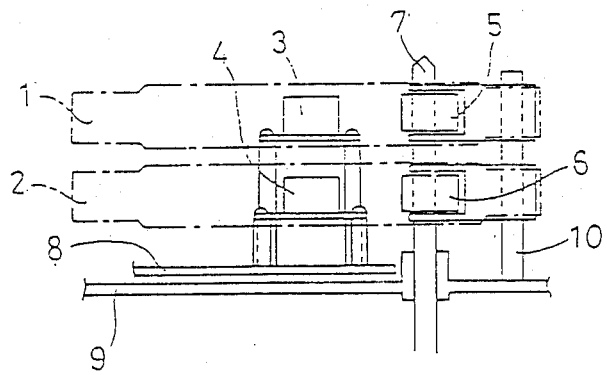
FIG. 3 schematically shows the relationship between the cassette tapes and the magnetic heads and pinch rollers of an embodiment of the tape recorder of the present invention.

FIG. 3 shows the relationship between the two cassette tapes and the magnetic heads and pinch rollers of the present invention. The first cassette tape 1 and the second cassette tape 2 are vertically and coaxially loaded in a pile. The magnetic heads 3 and 4 and the pinch rollers 5 and 6 are arranged at positions facing the magnetic surfaces of the first and second cassette tapes, respectively. A capstan 7 is mounted adjacent the pinch rollers 5 and 6. 8 is a sub-chassis, 9 is a main chassis and 10 is a pinch roller shaft.

Figure 4:
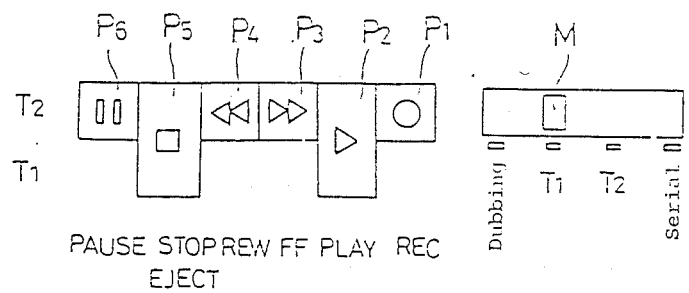
FIG. 4 is a plan view showing the mode selecting operation buttons of an embodiment of the tape recorder of the present invention.

FIG. 4 shows an example of the layout of operation buttons. The operation buttons on the lower row $T_1$ relate to the first cassette tape 1 and those on the upper low $T_2$ relate to the second cassette tape 2. $P_1$ through $P_6$ are RECORD, PLAY, FAST-FORWARD, REWIND, STOP/EJECT and PAUSE buttons, respectively. On the right is a mode selector switch. Dubbing, cassette tape 1, cassette tape 2 or serial reproduction mode is selected by moving the operation knob M of the switch.

In this embodiment of the present invention, as understood from the above, the first cassette tape has reproduction and stop/eject functions alone while the second cassette tape has recording, reproducing, fast-forwarding, rewinding, stop/eject and pause functions, namely all the functions which should be provided in a typical tape recorder. The reproduction and stop/eject functions common to both cassette tapes 1 and 2 are effected by operating the common buttons $P_2$ and $P_5$, respectively. The mode selecting operation knob M is set at a desired position for the first cassette tape mode, second cassette tape mode, dubbing mode in which information reproduced from the first cassette tape 1 is recorded in the second cassette tape 2, or serial reproduction mode in which reproduction from the first cassette tape 1 and the second cassette tape 2 is performed sequentially.

Figure 1:
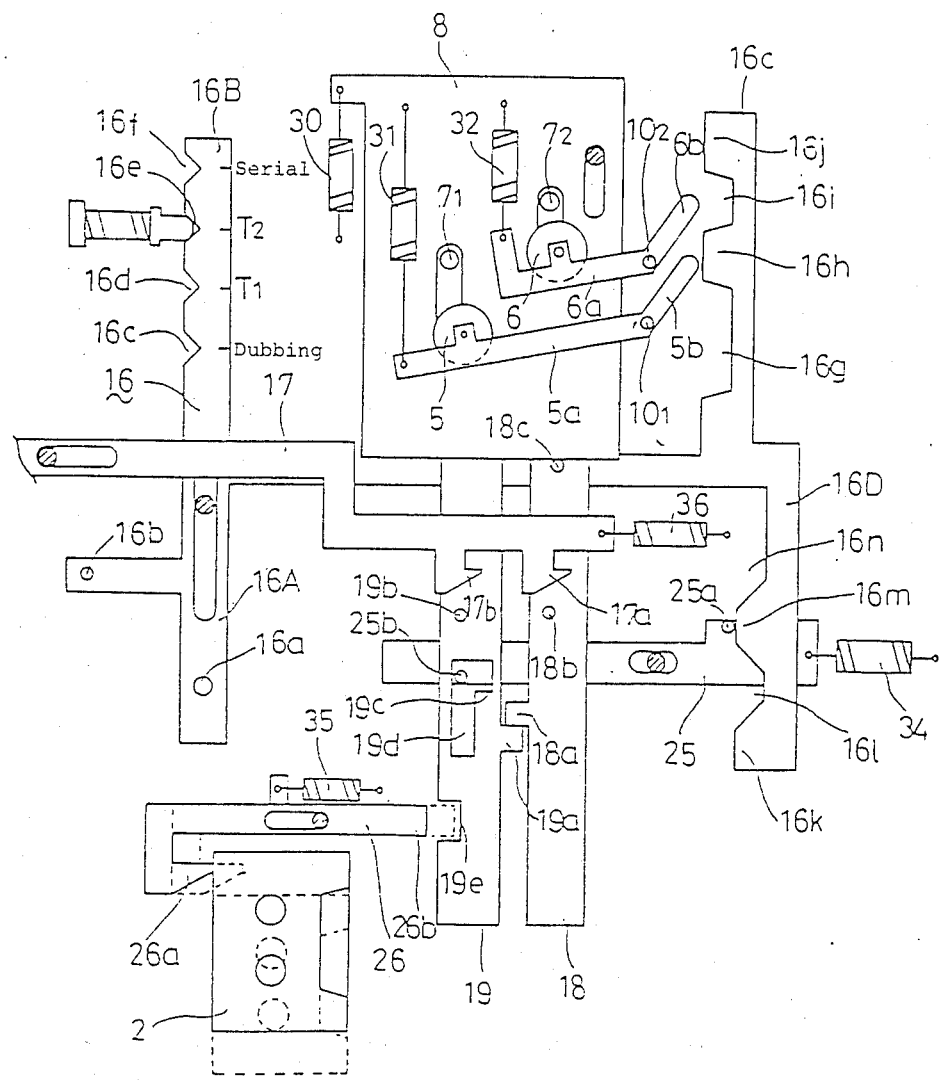
FIGS. 1 and 2 are schematical construction drawings showing a mode selection mechanism and a recording operation preventive mechanism of an embodiment of a tape recorder of the present invention.
Figure 2:
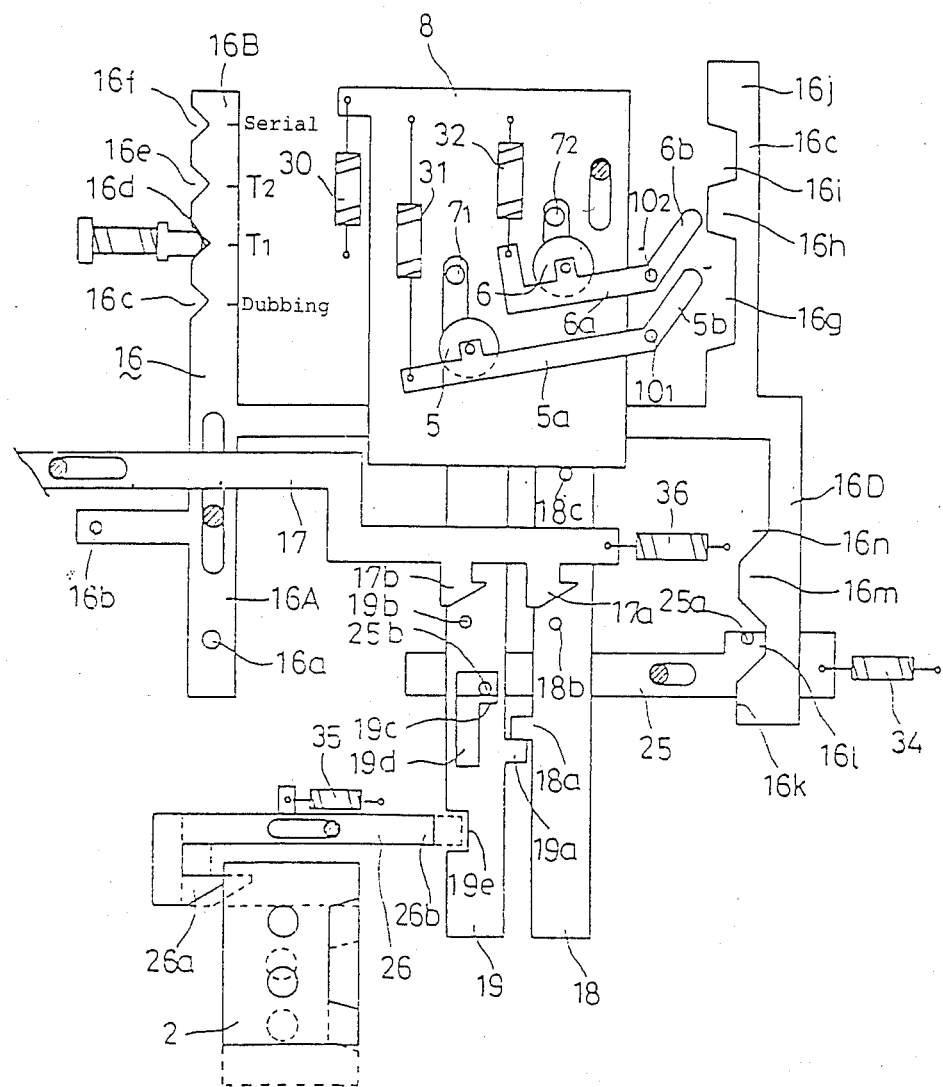

FIGS. 1 and 2 are plan views showing the essential part of the mode selection mechanism and the recording operation preventive mechanism.

A mode selector member 16 comprises a first arm 16A, a second arm 16B, a third arm 16C and a fourth arm 16D, the first arm 16A including pins 16a and 16b to be engaged with a lock release member (not shown), the second arm 16B including grooves 16c, 16d, 16e and 16f for defining the mode selector position, the third arm 16C including grooves 16g and 16i and projections 16h and 16j for pinch roller operation, the fourth arm 16D including projections 16k and 16m and grooves 16l and 16n for the blocking member operation. The mode selector member 16 is vertically movable in four steps according to the position of the operation knob M shown in FIG. 4. 18 is a reproducing operation member and 19 is a recording operation member. The reproducing operation member 18 and the recording operation member 19 move in the upward direction of FIGS. 1 and 2 when PLAY button $P_2$ and REC button $P_1$ are depressed, respectively. The reproducing operation member 18 is provided with a projection 18a for engagement with the recording operation member 19, a pin 18b for engagement with a hook 17a of a lock plate 17, and a pin 18c for pushing the sub-chassis 8. The recording operation member 19 is provided with a projection 19a for engagement with the projection 18a, a pin 19b for engagement with a hook 17b of the lock plate 17, an inverted-L-shaped hole 19d with a recording operation preventive step 19c, and a fool-proof groove 19e.

The sub-chassis 8 is pulled by a spring 30 in the downward direction of FIGS. 1 and 2. It moves upwardly being pressed by the pin 18c when the reproducing operation member 18 is pushed up. Springs 31 and 32, which are provided between the sub-chassis 8 and levers 5a and 6a of the pinch rollers 5 and 6, respectively, energize the levers 5a and 6a to rotate clockwise. The levers 5a and 6a rotate around the pinch roller shafts $10_1$ and $10_2$ as the sub-chassis 8 moves in the upward direction. Then the pinch rollers 5 and 6 are pressed against the capstans 7 and $7_2$, respectively. The respective ends 5b and 6b of the levers 5a and 6a extend to the area adjacent the projections and grooves 16g through 16j of the third arm 16C. For simplicity of the drawings, the capstan 7 is indicated by $7_1$ and $7_2$ and the pinch roller shaft 10 by $10_1$ and $10_2$ as if there were two capstans and two pinch roller shafts. Actually, however, there is only one capstan 7 and one pinch roller shaft 10 as shown in FIG. 3.

25 is a recording operation preventive member which is movable in the lateral directions of FIG. 1 and pulled to the right by a spring 34. The preventive member 25 includes a pin 25a at a position adjacent the projections and grooves 16k through 16n of the fourth arm 16D of the mode selector member 16, and a pin 25b located within the hole 19d of the recording operation member 19.

26 is a fool-proof member which is movable in the lateral directions of FIG. 1, and pulled toward the right by a spring 35 so that the projection 26a of the fool-proof member 26 comes in contact with the erroneous erasion preventive claw, if present, of the second cassette tape 2 and that the end 26b of the fool-proof member 26 is engaged with the groove 19e of the recording operation member 19 as shown by broken line if there is no erroneous erasion preventive claw. 36 is a spring which pulls the lock plate 17 in the rightward direction.

Operation of the invention is described now with reference to the drawings. FIG. 1 shows the position of each part of the mechanisms when the tape recorder stops its operation in the $T_2$ mode in which the second cassette tape 2 is selected. In this state, the pin 25a of the preventive member 25 is in contact with the projection 16 m of the mode selector member 16, so that the preventive member 25 is pushed toward the left. As a result, the pin 25b is located in the left portion of the hole 19d and not engaged with the step 19c of the hole 19d of the recording operation member 19. When the second cassette tape 2 loaded has an erroneous erasion preventive claw, i.e. is recordable, the fool-proof member 26 is positioned as shown by the solid line with the end 26b not being engaged with the groove 19e. Therefore, it is possible to push up the recording operation member 19.

When the recording operation member 19 is pushed up, the reproducing operation member 18 also moves up due to engagement between the projections 18a and 19a. The sub-chassis 8 is then pushed up by the pin 18c, causing the respective levers 5a and 6a of the pinch rollers 5 and 6 to rotate clockwise. However, since the rotation of the lever 5a is restricted by its end 5b being in contact with the projection 16h of the mode selector member 16, only the lever 6a rotates, pressing the pinch roller 6 alone against the capstan $7_2$ (capstan 7). Consequently, the second cassette tape 2 alone is driven for recording. At this time, the pins 18b and 19b are engaged with the hooks 17a and 17b, respectively, of the lock plate 17, so that the recording operation member 18 and the reproducing operation member 19 are locked in the depressed positions. Depression of STOP-/EJECT button P5 causes the lock plate 17 to shift leftwardly, whereby the engagement of the pins 18b and 19b with the hooks 17a and 17b is released. The recording operation member 19 and the reproducing operation member 18 then move downwardly, resuming the original state shown in FIG. 1, so that operation of the tape recorder is stopped. A mode detector switch (not shown) electrically detects the mode selected by the mode selector member 16 and switches over the control circuit accordingly.

FIG. 2 shows the position of each part of the mechanisms when the tape recorder stops its operation in the $T_1$ mode in which the first cassette tape 1 is selected. In this state, the pin 25a of the preventive member 25 is located in the groove 16l of the mode selector member 16. Therefore, the preventive member 25 is shifted toward the right, causing the pin 25b to be engaged with the step 19c of the hole 19d. As a result, the recording operation member 19 cannot be depressed regardless of whether the second cassette tape 2 is loaded or not and whether the erroneous erasion preventive claw is present or not. In this state, therefore, only the reproducing operation member 18 can be depressed. The end 5b of the pinch roller lever 5a is positioned in the groove 16g of the mode selector member 16 while the end 6b of the lever 6a contacts with the projection 16h. Accordingly, when the reproducing operation member 18 is depressed, the lever 5a alone rotates, causing the pinch roller 5 to be pressed against the capstan $7_1$ (the capstan 7) so that the first cassette tape 1 is driven.

In the serial mode, the pin 25a of the preventive member 25 is positioned in the groove 16n of the mode selector member 16, so that the preventive member 25 is shifted to the right. Consequently, the pin 25b is engaged with the step 19c, hampering the recording operation member 19 from being depressed. In the dubbing mode, as the pin 25a of the preventive member 25 contacts with the projection 16k of the mode selector member 16, the preventive member 25 is shifted to the left, releasing the engagement between the pin 25b and the step 19c. Therefore, it is possible to depress the recording operation member 19 if the second cassette tape 2 loaded is recordable.

In the embodiment of the present invention, as described above, the projections and grooves of the mode selector member 16 serve to control the position of the preventive member 25 as well as allow the pinch rollers 5 and 6 to be selectively pressed against the capstan 7. Accordingly, in relation to the function of the foolproof member 26, recording operation is possible only when the mode with recording function is selected and when the second cassette tape 2 is recordable. Thus, according to the present invention, a tape recorder whose operation is natural and therefore with higher value of commodity can be attained by a simple construction.

In the above embodiment, the invention is applied to the recording operation preventive mechanism. The invention may be applied to the prevention of other operations such as fast-forwarding and rewinding of cassette tapes when all of the cassette tapes loaded are not equipped for such functions.

As obvious from the above, in the tape recorder of the present invention in which at least a first and a second cassette tapes are loadable, the recording operation preventive device releases the recording operation member only when the mode selector member is positioned for the second cassette tape recording mode and when the loaded second cassette tape is recordable. Accordingly, the tape recorder of the present invention has no such conventional unnaturalness that recording operation button can be operated when the mode not related to recording function has been selected. Operationability and value of commodity of the tape recorder are therefore enhanced.

In the above description, the tape recorder can accommodate two cassette tapes. The invention is also applicable to a tape recorder in which three or more cassette tapes can be loaded.

While only certain embodiments of the present invention have been described, it will be apparent to those skilled in the art that various changes and modifications may be made therein without departing from the spirit and scope of the present invention as claimed.

What is claimed is:

1. A tape recorder comprising:
    a cassette tape compartment capable of detachably housing a first and a second cassette tapes;
    a capstan for driving said first and second cassette tapes coaxially mounted thereon;
    a mode selector member for selecting the driving mode for said first and second cassette tapes;
    a recording operation member to be operated for recording in said second cassette tape;
    a recording operation preventive member which communicates with said driving mode selector member so as to release engagement with said recording operation member only when said mode selector member selects the driving mode for recording in said second cassette tape; and
    a fool-proof member which detects presence or absence of an erroneous erasion preventive claw of the second cassette tape and releases engagement with said recording operation member only when the erroneous erasion preventive claw is present.

2. The tape recorder of claim 1, wherein said mode selector member selects the mode for driving the first cassette tape alone, the mode for driving the second cassette tape alone or the mode for driving the first and second cassette tapes simultaneously.

3. A tape recorder comprising:
    a cassette tape compartment for detachably housing a first and a second cassette tape;
    capstan for driving said first and second cassette tapes coaxially mounted thereon;
    a movable mode selector member for selecting a driving mode from among modes including a first cassette tape-driving mode and a second cassette tape-driving mode by being moved to particular positions;
    operation means for causing said second cassette tape to perform a first or a second function and causing said first cassette tape to perform the first function; means for allowing said second cassette tape to achieve the first or second function, in response to operation of the operation means corresponding to the first or second function, when said second cassette tape-driving mode has been selected by said mode selector member; means for allowing said first cassette tape to achieve the first function, in response to operation of the operation means corresponding to the first function, when said first cassette tape-driving mode has been selected by said mode selector member; and function blocking means operable in response to movement of said movable mode selector and before operation of said operation means for hindering said first cassette tape from achieving the second function when the operation means corresponding to the second function is operated in said first cassette tape-driving mode selected by said mode selector member.

4. A tape recorder as claimed in claim 3 wherein said first function is reproducing and said second function is recording.

5. A recording operation preventive device of a double system tape recorder in which two cassette tapes coaxially loaded in a pile are driven by one capstan, the first cassette tape being equipped for reproduction function alone, the second cassette tape being equipped for all the functions to be provided in a tape recorder and in which the mode for driving each cassette tape independently or the mode for driving the two cassette tapes simultaneously is selected by a mode selector member, said recording operation preventive device being characterized by a preventive member which interlocks with said mode selector member so as to release engagement with a recording operation member only when said mode selector member is positioned for the second cassette tape recording mode, and by a fool-proof member which detects presence or absence of an erroneous erasion preventive claw of the second cassette tape and releases engagement with said recording operation member only when the erroneous erasion preventive claw is present.

* * * * *